US008285938B2

(12) United States Patent
Canis Robles

(10) Patent No.: US 8,285,938 B2
(45) Date of Patent: Oct. 9, 2012

(54) PROCESSING UNIT AND METHOD OF MEMORY MANAGEMENT IN PROCESSING SYSTEMS WITH LIMITED RESOURCES

(75) Inventor: Javier Canis Robles, Madrid (ES)

(73) Assignee: SanDisk IL Ltd., Kfar Saba (IL)

( * ) Notice: Subject to any disclaimer, the term of this patent is extended or adjusted under 35 U.S.C. 154(b) by 434 days.

(21) Appl. No.: 11/573,399

(22) PCT Filed: Aug. 10, 2004

(86) PCT No.: PCT/ES2004/000372
§ 371 (c)(1),
(2), (4) Date: Feb. 8, 2007

(87) PCT Pub. No.: WO2006/030036
PCT Pub. Date: Mar. 23, 2006

(65) Prior Publication Data
US 2008/0195818 A1    Aug. 14, 2008

(51) Int. Cl.
*G06F 12/04* (2006.01)
(52) U.S. Cl. .... 711/132; 711/154; 711/171; 711/E12.02
(58) Field of Classification Search .................. 711/132
See application file for complete search history.

(56) References Cited

U.S. PATENT DOCUMENTS

| | | | | |
|---|---|---|---|---|
| 4,524,416 | A | * | 6/1985 | Stanley et al. ............... 711/200 |
| 5,497,494 | A | | 3/1996 | Combs et al. |
| 6,038,643 | A | * | 3/2000 | Tremblay et al. ............ 711/132 |
| 6,220,510 | B1 | | 4/2001 | Everett et al. |

FOREIGN PATENT DOCUMENTS

| | | |
|---|---|---|
| EP | 1 039 473 A2 | 9/2000 |
| JP | 2293939 A | 12/1990 |

OTHER PUBLICATIONS

International Search Report mailed May 6, 2005 for corresponding PCT Application No. PCT/ES2004/000372.
Written Opinion of the International Searching Authority mailed on May 6, 2005 for corresponding PCT Application No. PCT/ES2004/000372 (w/ English Translation).
International Preliminary Report on Patentability completed Jul. 5, 2007 for corresponding PCT Application No. PCT/ES2004/000372.

* cited by examiner

*Primary Examiner* — Kevin Ellis
*Assistant Examiner* — Eric Loonan
(74) *Attorney, Agent, or Firm* — Brinks Hofer Gilson & Lione

(57) ABSTRACT

The present invention is related with the management of memory in environments of limited resources, such as those found for example in a smart card. In a more particular manner, the invention relates to a method of managing the data storage resources of volatile memory, the object of which is to reduce the size of volatile memory necessary to implement the stack of the system, and thereby to reserve more volatile memory available for other needs or procedures of the system or of other applications When the stack grows and comes close to its established limit, the system carries out a transfer of a stack block located in the volatile memory to an area of non-volatile memory, hence this transfer allows a compression of the stack increasing its size in a virtual manner.

14 Claims, 3 Drawing Sheets

PROCESSING UNIT AND METHOD OF MEMORY MANAGEMENT IN PROCESSING SYSTEMS WITH LIMITED RESOURCES

CROSS REFERENCE TO RELATED APPLICATIONS

This Patent Application is the National Stage of the International Patent Application PCT/ES2004/000372

BACKGROUND OF THE INVENTION

1. Field of the Invention

The present invention is related with the memory management in environments of limited resources, that is, in systems with reduced storage and processing capacity, like those found for example on a smart card.

In more particular terms, the invention refers to a method of managing the data storage resources of volatile memory, the object of which is to reduce the size of volatile memory necessary to implement the stack of the system, and thereby to reserve more volatile memory available for other needs or procedures of the system or of other applications It is also an object of the invention to provide processing means which operate according to the memory management method referred lo above.

2. Description of Related Art

The portable data processing systems limited in volatile memory, like those found for example on a smart card, suffer major restrictions in the use of this type of memory in the system due to the scant size of memory available In multi-application systems, these restrictions are aggravated even more because each application can require the use of this type of memory for internal use, without its reuse or sharing being desired with other applications.

Conventionally the stack consists of a data structure of the type LIFO (Last In, First Out—the item of data last stored is the first one recovered) and a pointer which indicates which is the last item stored The stack is used to control the execution of the programs (linkage of functions and local variables). There is a size of volatile memory reserved for the stack, the stack pointer indicates the level of use of the same The stack is usually filled toward lower memory locations, with the limitation of the size resented for this. In the event that the established limitation is exceeded, the system should abort the execution of the process in course and report the error, since if it was not controlled it could cause a substantial error in the system and could signify a security hole

BRIEF SUMMARY OF THE INVENTION

The present invention resolves the technical problem outlined, by means of the inventive matter comprised in the enclosed independent claims The present invention allows a maximum variable or fixed size of volatile memory used for the stack to be defined, without overflow taking place or limitations of the system. This is achieved by making copies of data blocks of volatile memory of the stack to non-volatile memory, since the non-volatile memory, RAM or EEPROM for example, has fewer restrictions in size than the volatile memory When the stack grows and comes close to the limit established for this, the system carries out a transfer of a stack block located in the volatile memory to non-volatile memory area, this transfer allows a compression of the stack increasing its size in a virtual manner.

Therefore a first aspect of the invention relates to a method of memory management, wherein said memory comprises areas of nonvolatile memory and a stack formed by areas of volatile memory, so that a maximum size is defined of volatile memory used by the stack, and at least one block of data is transferred from the stack to non-volatile memory area, when the level of data storage in the stack is near to the maximum size defined for the same, that is when it could cause the following inclusion of data to produce the overflow of the same Once the block of data has been transferred, the stack is compacted, that is, the data are regrouped to free memory space and the pointer of the stack is increased.

The maximum size of volatile memory that is defined can be fixed or variable in terms of the amount of stack (including the blocks displaced to the nonvolatile memory) already spent.

The copying of volatile memory from the stack to non-volatile memory can take place several times, that is more than one block is transferred to areas of non-volatile memory, the only limitation being the available size of non-volatile memory.

The blocks of data that are transferred, are those which occupy the uppermost locations in the stack, since it is those blocks that the system will need the latest. The size of the blocks can be fixed or variable depending on which is the optimum size taking into account earlier uses of the stack.

When it is required to have one of the blocks of data transferred to non-volatile memory in the stack, the stack expands and the block of data is recovered by transferring it from the non-volatile memory to its original location in the stack in the reverse order to that with which they are extracted. Before the system requires locations of the stack that are stored in non-volatile memory, an expansion of the stack is carried out, the last block of stack memory transferred to non-volatile memory being returned to its original position of the stack located in volatile memory.

Another aspect of the invention relates to a processing unit which comprises programmable processing means such as a microprocessor and at least one memory with portions of volatile memory, which is characterized in that the memory is managed according to the method previously disclosed.

The processing unit can be implemented by means of an integrated circuit, which can be incorporated in any type of device, like a smart card for example.

The invention therefore allows space to be freed in the portion of volatile memory used by the stack, to avoid its overflow, and allow the use of this type of memory for other applications. As a consequence of these advantages, it is possible to increase "virtually" the volatile memory available in a system like for example in a smart card, whereby the useful life of the card is prolonged since the replacement thereof is not necessary when new applications need to be loaded that require more memory, and the possible uses of the card are increased.

BRIEF DESCRIPTION OF SEVERAL VIEWS OF THE DRAWINGS

To complete the description that is being made and with the object of assisting in a better understanding of the characteristics of the invention, in accordance with a preferred example of practical embodiment of the same, this description is accompanied with a set of drawings, as an integral part thereof, wherein by way of illustration and not restrictively, the following has been represented.

FIG. 1B is a similar representation to that of FIG. 1A wherein it is shown by means of an arrow, how a block defined by discontinuous lines, is transferred to portions of non-volatile memory.

FIG. 2B illustrates how a block of data is transferred whenever the portion of volatile memory used by the stack, comes close to the overflow area.

DETAILED DESCRIPTION OF THE INVENTION

The invention will be described below with respect to non-limiting preferred embodiments.

Figure 1:
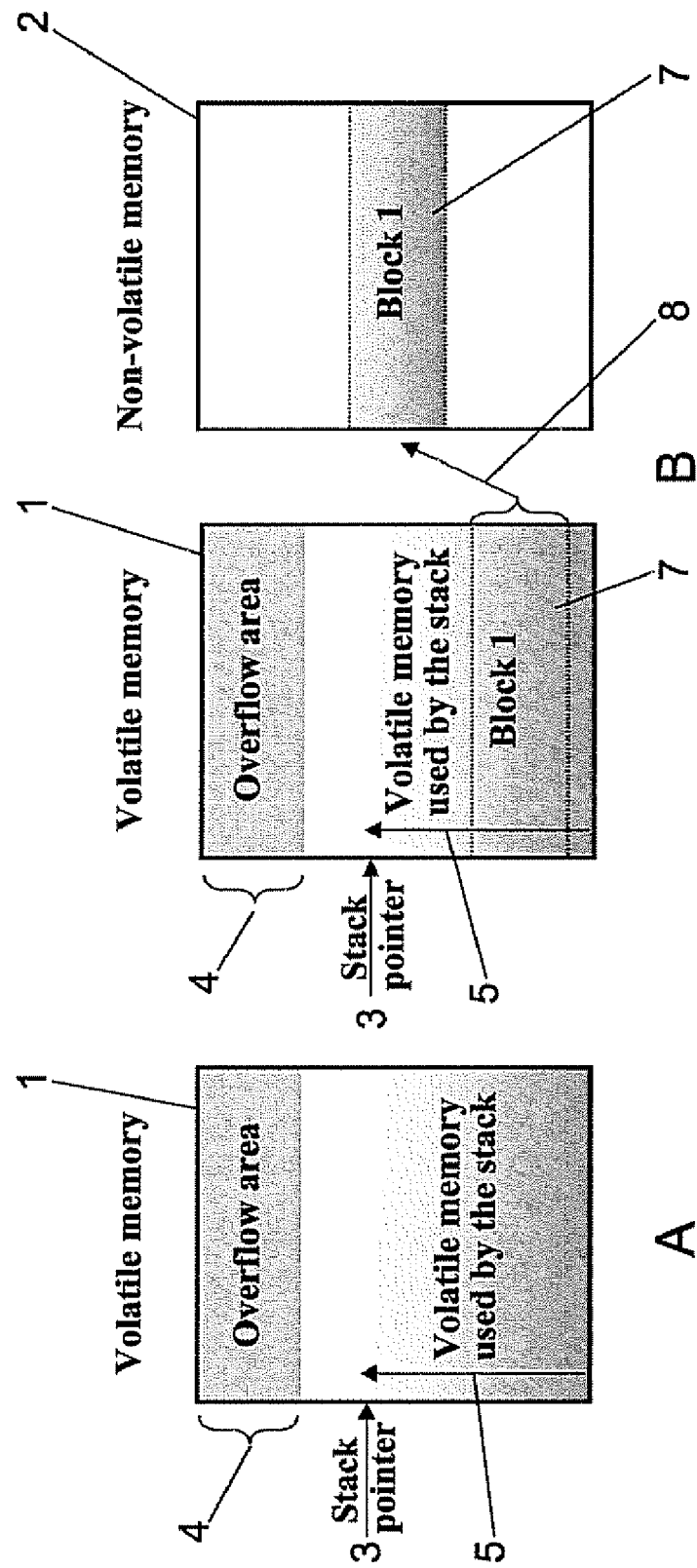
FIG. 1—Shown schematically in FIG. 1A is a block representative of a portion of volatile memory wherein the overflow area and the area of volatile memory used by the stack next to the overflow area are indicated as shaded areas.

In FIG. 1A a portion of volatile memory (1) is appreciated in which an overflow area (4) is defined, and an area of volatile memory used by the stack (5) defined by the position of the stack pointer (3). When the stack grows toward lower memory locations, that is when it is detected that the stack pointer (3) is coming dangerously close to the overflow area (4), so that the overflow of the stack could take place, such as in the case of FIG. 1A, a first block of data (7) is transferred from the stack in use to an area of non-volatile memory (2) as indicated by the arrow (8) of FIG. 1B The stack area and the size which form said first block of data (7) can vary in terms of how the system manages the stack, preferably the most advantageous will be chosen for each system, for example, a stack area used in which the stack pointer is usually underneath.

Figure 2:
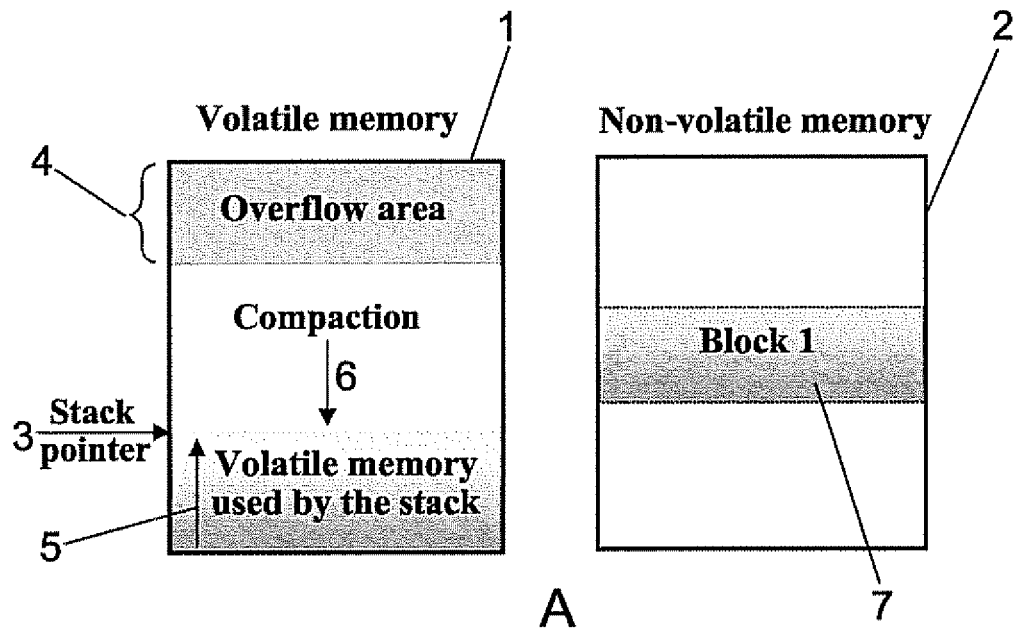
FIG. 2—In FIG. 2A it is shown how once a block of data is transferred to non-volatile memory, the stack is compacted
Figure 2:
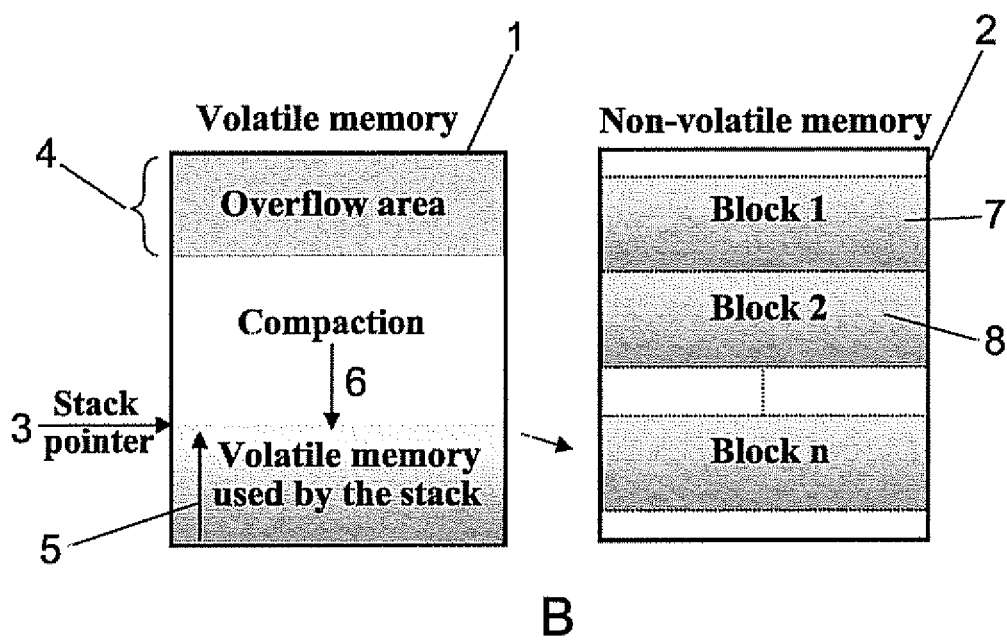

Once the block (7) is transferred, a compaction (6) of the stack takes place and an increment of the stack pointer (3), that is, it is moved to lower areas such as has been represented in FIG. 2A. This way the stack is relieved of data to store, the object being that the portions of volatile memory (1) released can be used in other needs of the system or by other applications. This copying of blocks and compaction of the stack will take place whenever the stack pointer (3) comes close to the overflow area (4), such as has been represented in FIG. 2B and wherein it is appreciated how a second block of data (8) has been transferred to non-volatile memory (2).

Figure 3:
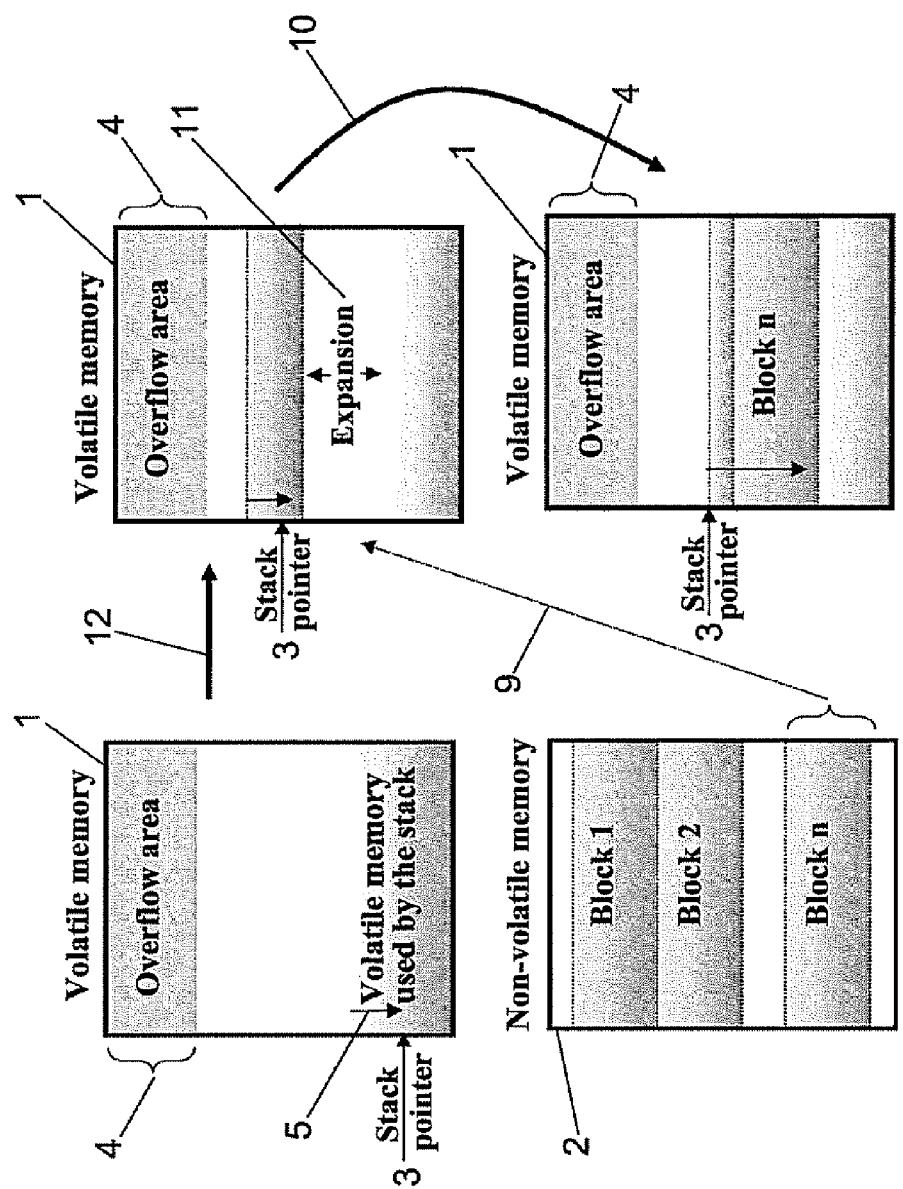
FIG. 3—It consists of a similar representation to that of FIG. 1, in which the process of expansion of the stack is shown in order to recover in the stack a block of data that was transferred to non-volatile memory.

In FIG. 3 the process of recovering the blocks of transferred data is appreciated, thus when the stack pointer (3) increases and comes close to the locations in which the data transferred to the non-volatile memory (2) were before, an expansion (11) of the stack takes place to allow a transfer to be carried out, as indicated by the arrow (9), of the block which was copied earlier to the volatile memory that forms the stack. In FIG. 3, the arrows (12) and (10) indicate the sequence of actions in the stack for recovery of a block of data.

Diverse possibilities of practical embodiment of the invention are described in the enclosed dependent claims.

In the light of this description and set of figures, an expert in the matter will be capable of understanding that the embodiments of the invention which have been described can be combined in multiple ways within the object of the invention. The invention has been described according to some preferred embodiments of the same, but for an expert in the matter it will be evident that multiple variations can be introduced in said preferred embodiments without departing from the object of the claimed invention

What is claimed is:

1. A method for managing a stack in a volatile memory, the method comprising:
    determining whether to transfer data from the stack formed in a volatile memory area;
    determining a size of a data block to transfer from the stack based on at least one criterion related to the stack; and
    transferring the data block from the stack in the volatile memory area to a non-volatile memory area in response to determining to transfer data from the stack,
    wherein determining the size of the data block to transfer from the stack comprises determining whether the size of the data block is a fixed size or a variable size based on previous uses of the stack.

2. The method according to claim 1, wherein the stack is compacted and a pointer of the stack is moved once the data block has been transferred.

3. The method according to claim 1, wherein a level of data storage use of the stack is monitored in a continuous manner.

4. The method according to claim 1, wherein the stack is a fixed maximum size.

5. The method according to claim 1, wherein the stack is a variable maximum size.

6. The method according to claim 1, wherein transferring the data block includes data that occupies an uppermost location of the stack.

7. The method according to claim 1, further comprising expanding the stack to recover the data transferred to non-volatile memory, wherein expanding the stack includes transferring the data from the non-volatile memory area to an original location in the stack.

8. A memory card comprising:
    a volatile memory configured to store a stack of data;
    a non-volatile memory; and
    a processor configured to communicate with the volatile memory and the non-volatile memory,
    wherein the processor is configured to:
        determine whether to transfer at least part of the data from the stack;
        determine whether a size of a data block to transfer from the stack is a fixed size or a variable size based on previous uses of the stack; and
        transfer the data block of the determined size from the volatile memory to the non-volatile memory in response to determining to transfer at least a part of the data from the stack.

9. The memory card according to claim 8, wherein the processor and the non-volatile memory make up a processing unit.

10. The memory card according to claim 9, wherein the processing unit is an integrated circuit.

11. The memory card according to claim 8, wherein the stack of data is used for processing a first application.

12. The memory card according to claim 11, wherein the processor is configured to transfer the data block of the determined size to the non-volatile memory to allow for use of the volatile memory for other applications.

13. The memory card according to claim 8, wherein the memory card is a smart card.

14. The memory card according to claim 8, wherein the processor is configured to determine whether to transfer data from the stack by determining whether a level of data storage in the stack is indicative of potential overflow of the stack.

* * * * *

UNITED STATES PATENT AND TRADEMARK OFFICE
CERTIFICATE OF CORRECTION

| | | |
|---|---|---|
| PATENT NO. | : 8,285,938 B2 | Page 1 of 1 |
| APPLICATION NO. | : 11/573399 | |
| DATED | : October 9, 2012 | |
| INVENTOR(S) | : Javier Canis Robles | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 560 days.

Signed and Sealed this
Twenty-sixth Day of August, 2014

Michelle K. Lee
*Deputy Director of the United States Patent and Trademark Office*